(12) United States Patent
Kuntze et al.

(10) Patent No.: US 7,896,374 B2
(45) Date of Patent: Mar. 1, 2011

(54) OVERMOLDED MAGNESIUM

(75) Inventors: Christopher J. Kuntze, Clarkston, MI (US); Timothy O'Brien, White Lake, MI (US); Steven Giles, Troy, MI (US)

(73) Assignee: Magna International Inc., Aurora, Ontario (CA)

( * ) Notice: Subject to any disclaimer, the term of this patent is extended or adjusted under 35 U.S.C. 154(b) by 495 days.

(21) Appl. No.: 11/983,283

(22) Filed: Nov. 8, 2007

(65) Prior Publication Data

US 2009/0121449 A1    May 14, 2009

(51) Int. Cl.
*B60R 3/00* (2006.01)
(52) U.S. Cl. .......................................... 280/169; 280/163
(58) Field of Classification Search .................. 280/163, 280/169, 164.1; 264/5, 6
See application file for complete search history.

(56) References Cited

U.S. PATENT DOCUMENTS

| | | | |
|---|---|---|---|
| 5,190,803 A | 3/1993 | Goldbach et al. | |
| 5,842,265 A | 12/1998 | Rink | |
| 6,050,579 A * | 4/2000 | Selland et al. | 280/163 |
| 6,120,714 A * | 9/2000 | Allan et al. | 264/69 |
| 6,173,979 B1 * | 1/2001 | Bernard | 280/163 |
| 6,409,193 B2 * | 6/2002 | Bernard | 280/163 |
| 6,440,524 B2 * | 8/2002 | Valyi et al. | 428/99 |
| 6,481,733 B1 * | 11/2002 | Shellabarger | 280/163 |
| 6,513,821 B1 * | 2/2003 | Heil | 280/169 |
| 6,627,278 B1 * | 9/2003 | Sandstrom et al. | 428/35.7 |
| 6,649,002 B2 * | 11/2003 | Preisler et al. | 156/221 |
| 6,780,365 B2 * | 8/2004 | Goldbach | 264/251 |
| 6,866,905 B1 * | 3/2005 | Sandstrom et al. | 428/34.1 |
| 6,997,469 B2 * | 2/2006 | Lanoue et al. | 280/163 |
| 7,322,593 B2 * | 1/2008 | Smith et al. | 280/163 |
| 7,673,892 B2 * | 3/2010 | Kuntze et al. | 280/163 |
| 2001/0017452 A1 * | 8/2001 | Bernard | 280/163 |
| 2002/0086597 A1 * | 7/2002 | Preisler et al. | 442/43 |
| 2003/0006576 A1 * | 1/2003 | Lanoue et al. | 280/163 |
| 2003/0184039 A1 * | 10/2003 | Schumacher | 280/163 |
| 2004/0142132 A1 * | 7/2004 | Sandstrom et al. | 428/35.7 |
| 2004/0239068 A1 * | 12/2004 | Chuba et al. | 280/163 |
| 2006/0119065 A1 * | 6/2006 | Lanoue et al. | 280/163 |
| 2006/0249924 A1 * | 11/2006 | Armstrong et al. | 280/163 |
| 2007/0296175 A1 * | 12/2007 | Flajnik et al. | 280/169 |
| 2008/0156600 A1 * | 7/2008 | Eastham | 188/250 B |
| 2009/0121449 A1 * | 5/2009 | Kuntze et al. | 280/163 |
| 2010/0044923 A1 * | 2/2010 | Haimoff et al. | 264/478 |

* cited by examiner

*Primary Examiner* — Jeffrey J Restifo
(74) *Attorney, Agent, or Firm* — Clark Hill PLC

(57) ABSTRACT

A method of manufacturing an assembly, including a structural member and an appearance feature formed therealong, is provided utilizing first and second molds. The method includes the steps of: injecting magnesium into the first mold to form the structural member; removing the structural member from the first mold; placing the structural member in the second mold; and injecting thermoplastic material into the second mold to overmold the appearance feature along a portion of the structural member.

5 Claims, 3 Drawing Sheets

OVERMOLDED MAGNESIUM

BACKGROUND

The invention relates to structural components formed from magnesium and including appearance features overmolded thereto, and to a method for manufacturing these structural components.

It is well-known in the art to provide structural components or running boards for assisting individuals in either entering and exiting or accessing motor vehicles having a high ground clearance. These running boards may include at least one mounting bracket for mounting a step or platform alongside the motor vehicle. Various appearance features, such as covers, step mats, end caps, shields, and the like, are formed as separate elements that are secured to the mounting bracket and/or the step or platform. Each of these appearance features typically requires individual attachment to the mounting bracket or platform, takes up valuable packaging space, and limits styling flexibility.

SUMMARY

According to one aspect of the invention, a method of manufacturing an assembly, including a structural member and an appearance feature formed therealong, utilizes first and second molds. The method includes the steps of: injecting magnesium into the first mold to form the structural member; removing the structural member from the first mold; placing the structural member in the second mold; and injecting thermoplastic material into the second mold to overmold the appearance feature along a portion of the structural member.

According to another aspect of the invention, a method of manufacturing a running board assembly, including a platform, a mounting bracket, and an appearance feature, via first and second molds, includes the steps of: injecting magnesium into the first mold to form the platform; removing the platform from the first mold; attaching the mounting bracket to the platform; placing the platform and the mounting bracket attached thereto into the second mold; and injecting thermoplastic material into the second mold to overmold the appearance feature along at least one of the platform and the mounting bracket.

According to yet another aspect of the invention, a running board assembly for a motor vehicle includes a structural member including a platform formed from injection molded magnesium and adapted to be mounted to the motor vehicle. The platform includes a stepping surface extending between opposing ends. The running board assembly also includes an appearance feature injection molded onto the platform.

BRIEF DESCRIPTION OF THE DRAWINGS

The invention will be readily appreciated as the same becomes better understood by reference to the following detailed description when considered in connection with the accompanying drawings wherein.

DETAILED DESCRIPTION OF THE EMBODIMENTS

Figure 1:
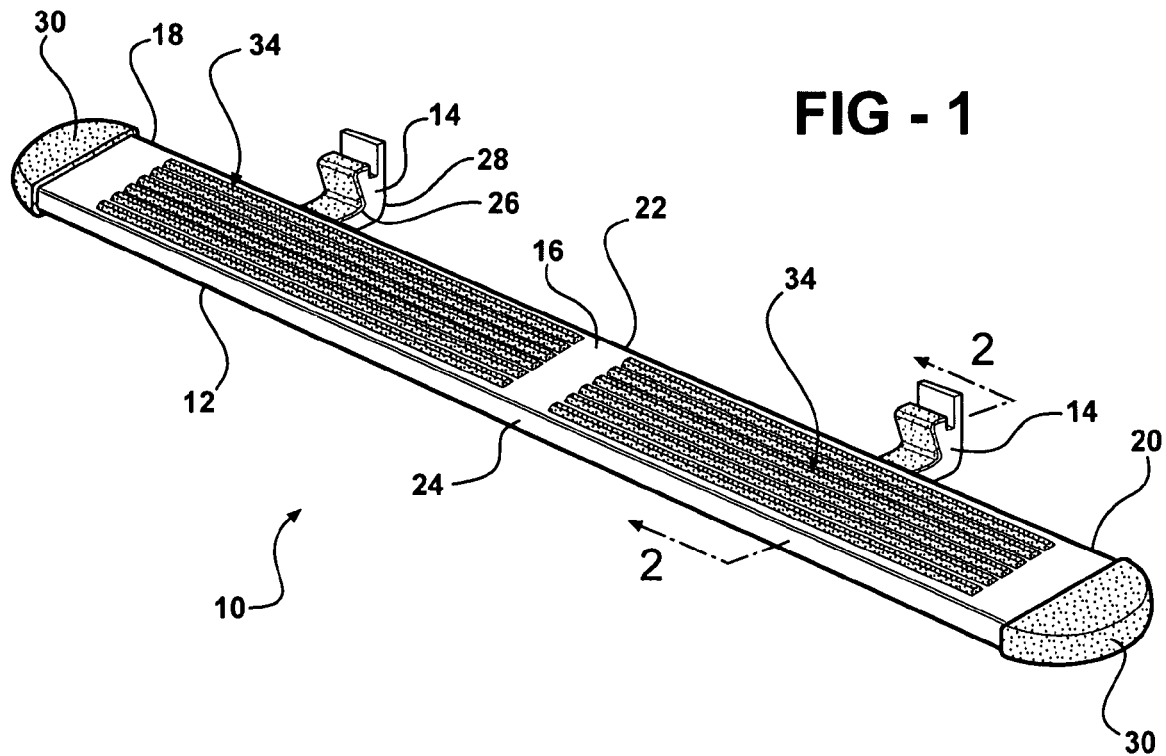
FIG. 1 is a perspective view of a running board assembly including a platform, formed from magnesium, and a mounting bracket with appearance features overmolded thereto according to one embodiment.

Referring to FIG. 1, an assembly, generally shown at 10, includes at least one structural member 12, 14 and at least one appearance feature overmolded to the at least one structural member 12, 14. Each structural member 12, 14 is formed from injection molded magnesium. Each structural member 12, 14 is, therefore, a lightweight but generally rigid member. It is appreciated that the assembly 10 may be any of various parts or components for use in numerous industries.

In one embodiment of the invention, the assembly 10 is a running board assembly and the structural members 12, 14 are a platform and mounting brackets respectively. The platform 12 of the running board assembly 10 includes a stepping surface 16 for supporting individuals entering or exiting a motor vehicle. The platform 12 extends longitudinally between a pair of opposing ends 18, 20, and laterally between an inboard end 22 and an outboard end 24.

The mounting brackets 14 are fixedly secured to the platform 12 and adapted for attachment to the motor vehicle. The mounting brackets 14 mount, therefore, the platform 12 to the motor vehicle. It is appreciated that the platform 12 and the mounting brackets 14 may be formed as an integrally formed single piece or as separate pieces fixedly secured to one another. In the current embodiment, the running board assembly 10 includes a pair of mounting brackets 14 spaced apart from one another. Each mounting bracket 14 includes an outboard facing surface 26 and an inboard edge 28.

The running board assembly 10 further includes at least one appearance feature overmolded to a portion of the platform 12 and/or the mounting brackets 14. Each appearance feature is formed from a thermoplastic material. One appearance feature is an end cap 30 overmolded to the platform 12 at each opposing end 16, 18 thereof. The end caps 30 provide a finished look to the opposing ends 18, 20 of the platform 12.

Figure 2:
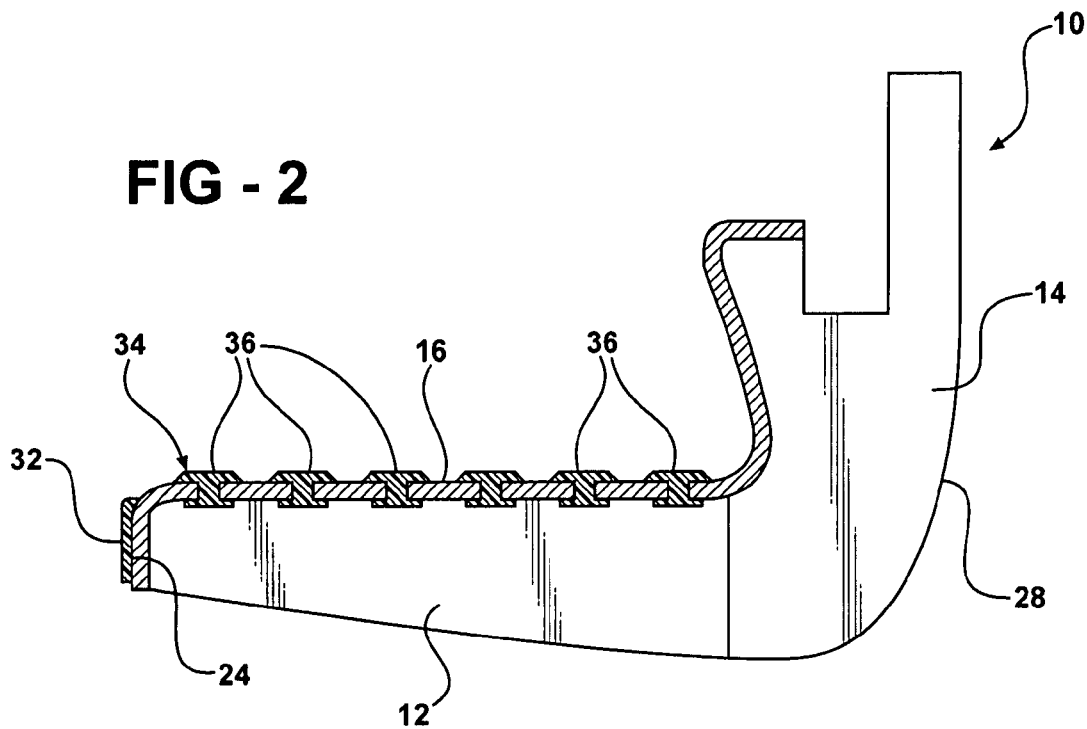
FIG. 2 is a section view of the running board assembly including the platform and the mounting bracket.

Another appearance feature is a shield 32 formed along the outboard facing surface 26 of the mounting brackets 14. The shield 32 may also be formed along the outboard end 24 of the platform 12, as shown in FIG. 2. The shield 32 protects the platform 12 and the mounting brackets 14 from damage from stone pecking as may occur during normal operation of the motor vehicle.

Another appearance feature for the platform 12 is a step mat, generally indicated at 34, which is formed in a longitudinal direction along the stepping surface 16. In the current embodiment, the step mat 34 includes a plurality of tread portions 36 each spaced apart from one another in a lateral direction. The step mat 34 provides traction to individuals stepping onto the platform 12.

Figure 3:
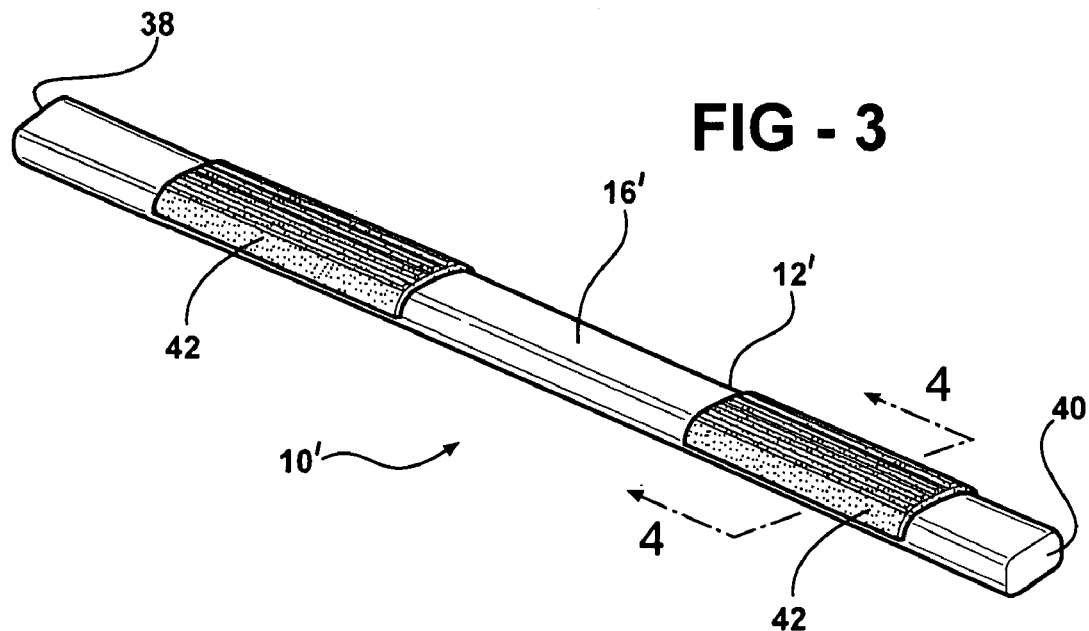
FIG. 3 is a perspective view of a running board including a tubular member and appearance features overmolded therealong.
Figure 4:
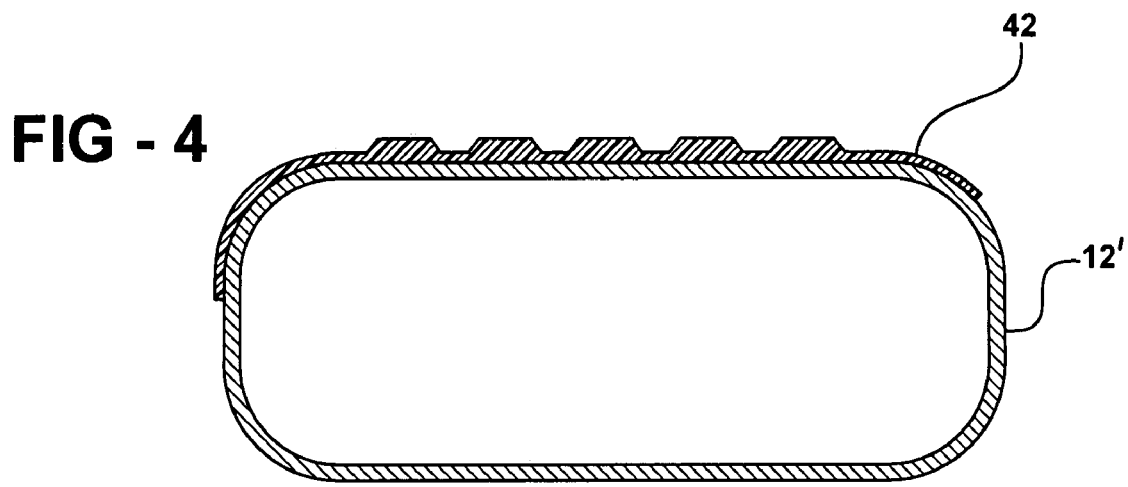
FIG. 4 is a cross-sectional view taken along lines 4-4 in FIG. 3.
Figure 5:
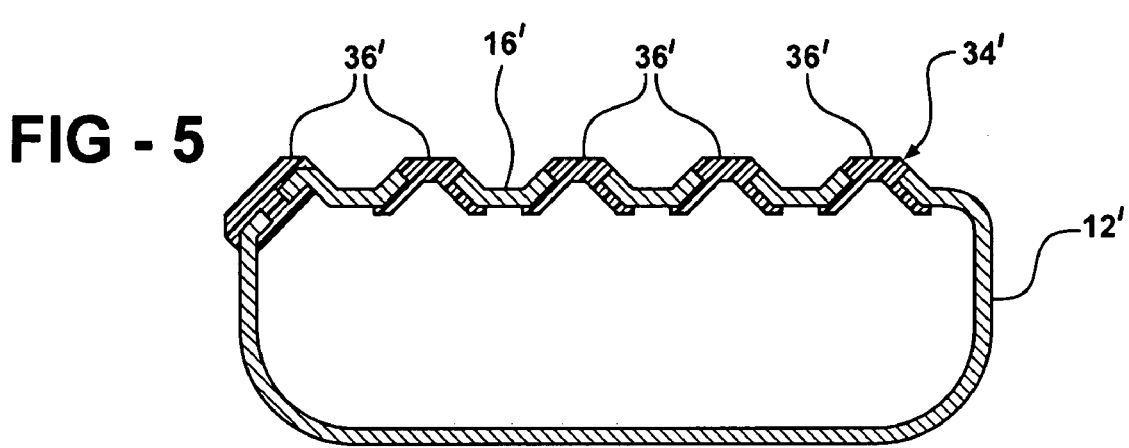
FIG. 5 is a cross-sectional view of the tubular member wherein the appearance feature is a step mat.
Figure 6:
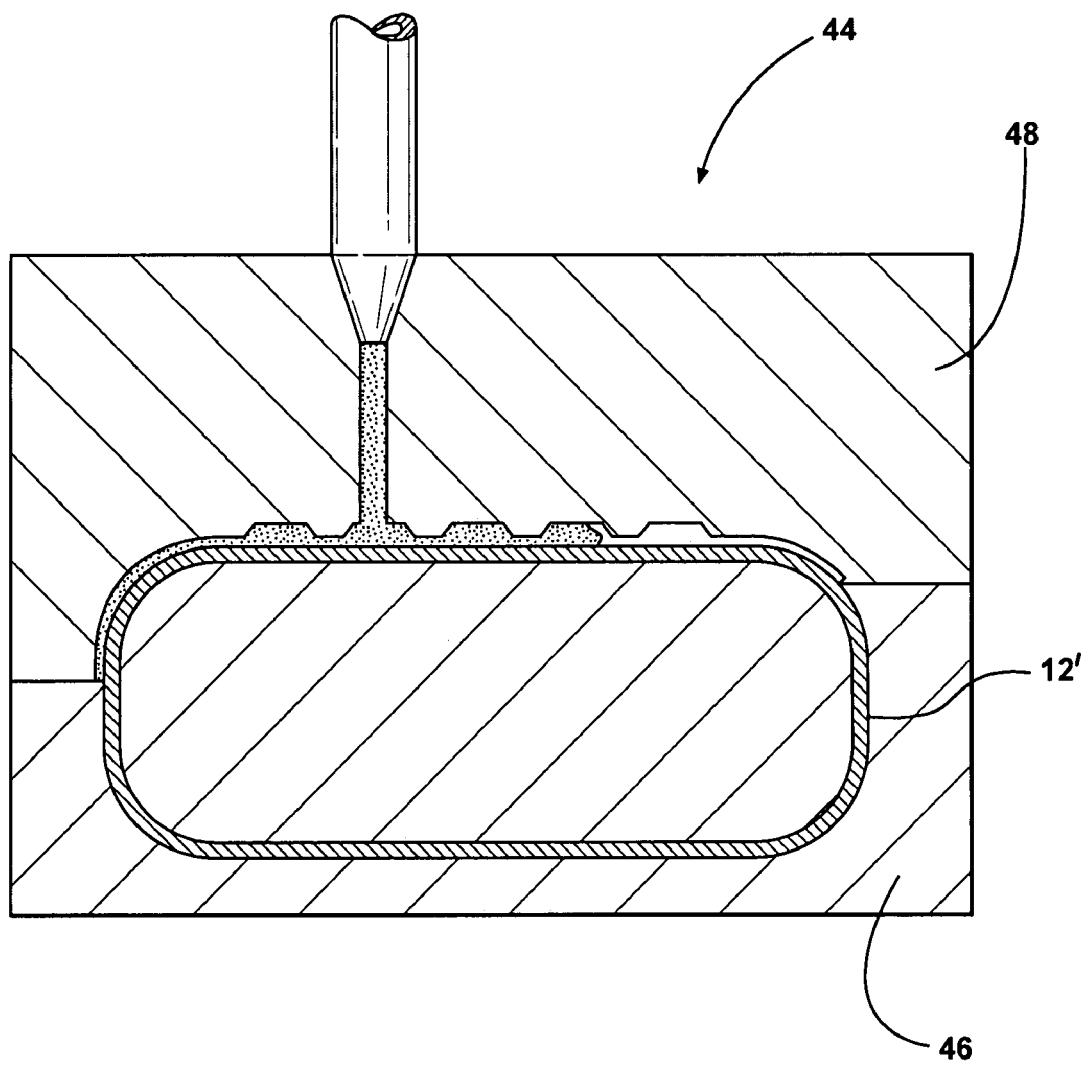
FIG. 6 is a cross-sectional view of a mold for receiving the running board and mounting brackets for overmolding appearance features thereto.

Referring to FIGS. 3 and 4, in another embodiment the structural member 12' of the running board assembly 10' is a tubular member extending between inboard-facing ends 38, 40. The tubular member 12' includes the stepping surface 16' extending longitudinally between the opposing ends 38, 40. In the current embodiment, the appearance feature is a cover 42 overmolded to the stepping surface 16'. The cover 42 extends continuously along the stepping surface 16' in a lateral direction. In another embodiment, shown in FIG. 5, the appearance feature is the step mat 34' including the plurality of tread portions 36' formed along the stepping surface 16' of the tubular member 12' and spaced apart from one another in a lateral direction.

First and second molds are utilized in a method of manufacturing the assembly 10, 10'. The first step in the method for manufacturing the assembly 10 is forming the structural member 12 by injection molding magnesium into the first mold. The structural member 12 is removed from the first mold. The structural member 12 is placed in a second mold 44. The second mold 44 includes a lower mold half 46 and an upper mold half 48 movable relative to the lower mold half 46. The second mold 44 is closed and thermoplastic material is injected therein. As a result, the thermoplastic material is formed into one or more appearance features overmolded to a portion of the structural member 12. A finishing operation may be conducted on the structural member 12 either after the step of forming the structural member by injection molding magnesium is completed or after the one or more appearance features are overmolded onto the structural member 12.

In a method according to another embodiment of the invention, a method of manufacturing the running board assembly 10 begins with the step of injecting magnesium into the first mold to form the platform 12. The platform 12 is then removed from the first mold. The mounting bracket 14 is attached to the platform 12 either by integrally molding the mounting bracket 14 with the platform 12 or by attaching the mounting brackets 14 to the platform 12 after molding thereof. The platform 12 and the mounting bracket 14 are placed in the second mold. The upper mold half 48 is closed against the lower mold half 46 and thermoplastic material is injected into the second mold to overmold the at least one appearance feature to at least one of the platform and mounting bracket.

It is appreciated that the above-described methods could be utilized to provide appearance features with various colors, materials, and textures. The running board assemblies 10, 10' manufactured according to these embodiments can be produced at a lower cost due to reduced complexity, fewer part numbers, and lower labor requirements. Moreover, quality is improved through the use of fewer components, less variables and variation, and little or no warpage concerns. As an added benefit, there is greater flexibility with regard to overall styling.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed:

1. A method of manufacturing a running board assembly, including a platform, a mounting bracket, and an appearance feature, via first and second molds, the method comprising the steps of:

injecting magnesium into the first mold to form the platform;

removing the platform from the first mold;

attaching the mounting bracket to the platform;

placing the platform and the mounting bracket attached thereto in the second mold; and injecting thermoplastic material into the second mold to overmold the appearance feature along at least one of the platform and mounting bracket.

2. A method as set forth in claim 1 wherein the step of attaching the mounting bracket to the platform occurs at the same time as the step of injecting magnesium into the first mold to form the platform such that the platform and the mounting bracket are formed as one piece.

3. A method as set forth in claim 1 wherein the step of attaching the mounting bracket to the platform occurs subsequent to the step of injecting magnesium into the first mold to form the platform.

4. A method as set forth in claim 1 wherein the step of injecting thermoplastic material into the second mold to overmold the appearance feature along at least one of the platform and mounting bracket includes forming a shield along a portion of at least one of the platform and the mounting bracket.

5. A method as set forth in claim 1 wherein the step of injecting thermoplastic material into the second mold to overmold the appearance feature along at least one of the platform and mounting bracket includes forming a step mat including a plurality of spaced apart tread portions along the platform.

\* \* \* \* \*